(12) United States Patent
Jun (10) Patent No.: US 11,718,804 B2
(45) Date of Patent: Aug. 8, 2023

(54) AQUEOUS METAL COLLOID COMBUSTION ADDITIVE

(71) Applicant: Kyung Hoon Jun, Seoul (KR)

(72) Inventor: Kyung Hoon Jun, Seoul (KR)

( * ) Notice: Subject to any disclaimer, the term of this patent is extended or adjusted under 35 U.S.C. 154(b) by 0 days.

(21) Appl. No.: 17/423,480

(22) PCT Filed: Jan. 17, 2020

(86) PCT No.: PCT/EP2020/051199
§ 371 (c)(1),
(2) Date: Jul. 16, 2021

(87) PCT Pub. No.: WO2020/152065
PCT Pub. Date: Jul. 30, 2020

(65) Prior Publication Data
US 2022/0073831 A1 Mar. 10, 2022

(30) Foreign Application Priority Data

Jan. 25, 2019 (GB) ...................................... 1901077
Sep. 18, 2019 (WO) ................. PCT/EP2019/075027

(51) Int. Cl.
*C10L 1/12* (2006.01)
*C25B 15/08* (2006.01)
(Continued)

(52) U.S. Cl.
CPC .......... *C10L 1/1208* (2013.01); *B01J 13/0034* (2013.01); *B01J 13/0043* (2013.01);
(Continued)

(58) Field of Classification Search
CPC ...... C10L 1/1208; C10L 1/125; C10L 1/1266; C10L 10/02; C10L 10/04;
(Continued)

(56) References Cited

U.S. PATENT DOCUMENTS 2,391,895 A * 1/1946 Gunderson ............. C02F 5/083
210/698
2,986,456 A   5/1961 Toulmin, Jr. et al.
(Continued)

FOREIGN PATENT DOCUMENTS

JP    2008-150421 A    7/2008
WO    2013/177512 A1   11/2013
(Continued)

OTHER PUBLICATIONS

Shiva Kumar et al., "Experimental investigation of the effects of nanoparticles as an additive in diesel and biodiesel fuelled engines: a review", Biofuels,vol. 10, No. 5, May 31, 2017 (May 31, 2017), p. 615-622.

(Continued)

*Primary Examiner* — Cephia D Toomer
(74) *Attorney, Agent, or Firm* — Park, Kim & Suh, LLC (57) ABSTRACT

The present invention relates to a combustion additive comprising a colloidal solution containing dispersed fine metal particles. The present invention also relates to a method for producing the colloid. More particularly the present teaching relates to a combustion additive having a colloid, wherein the colloid comprises metal particles providing in an alkaline aqueous solution, the metal particles being dispersed within that solution and having an average diameter in the range of 30 nm to 30 μm. The colloid can partly/fully substitute water of a water injection system or used as an air humidification component for combustion.

4 Claims, 7 Drawing Sheets

(51) Int. Cl.
*C25B 1/01* (2021.01)
*C25B 11/046* (2021.01)
*B01J 13/00* (2006.01)
*C10L 10/02* (2006.01)
*C10L 10/04* (2006.01)
*C25B 9/00* (2021.01)
*C25B 15/02* (2021.01)

(52) U.S. Cl.
CPC ............. *C10L 1/125* (2013.01); *C10L 1/1266* (2013.01); *C10L 10/02* (2013.01); *C10L 10/04* (2013.01); *C25B 1/01* (2021.01); *C25B 9/00* (2013.01); *C25B 11/046* (2021.01); *C25B 15/02* (2013.01); *C25B 15/085* (2021.01); *C10L 2200/024* (2013.01); *C10L 2200/0209* (2013.01); *C10L 2200/0218* (2013.01); *C10L 2200/0231* (2013.01); *C10L 2230/04* (2013.01); *C10L 2230/22* (2013.01)

(58) Field of Classification Search
CPC ..... C10L 2200/0209; C10L 2200/0218; C10L 2200/0231; C10L 2200/024; C10L 2230/04; C10L 2230/22; C25B 15/085; C25B 1/01; C25B 11/046; C25B 9/00; C25B 15/02; B01J 13/0034; B01J 13/0043
See application file for complete search history.

(56) References Cited

U.S. PATENT DOCUMENTS

| | | |
|---|---|---|
| 6,471,506 B1 | 10/2002 | Zamansky et al. |
| 9,822,320 B1 | 11/2017 | Wright et al. |
| 2006/0141149 A1 | 6/2006 | Chen et al. |
| 2010/0095580 A1 | 4/2010 | Suzuki |
| 2013/0337998 A1 | 12/2013 | Irving et al. |
| 2016/0318817 A1* | 11/2016 | Chand ................. C05B 17/00 |
| 2018/0244586 A1 | 8/2018 | Chand |
| 2018/0304198 A1 | 10/2018 | Lecolier et al. |

FOREIGN PATENT DOCUMENTS

| | | |
|---|---|---|
| WO | 2014/056790 A1 | 4/2014 |
| WO | 2015/003678 A1 | 1/2015 |

OTHER PUBLICATIONS

Miqdam Tariq Chaichan et al, "Novel technique for enhancement of diesel fuel: Impact of aqueous alumina nano-fluid on engine's performance and emissions", Case Studies in Thermal Engineering, vol. 10, Nov. 15, 2017 (Nov. 15, 2017), p. 611-620.

* cited by examiner

AQUEOUS METAL COLLOID COMBUSTION ADDITIVE

CROSS-REFERENCE TO RELATED APPLICATIONS

This application is the National Stage filing under 35 U.S.C. 371 of International Application No. PCT/EP2020/051199, filed on Jan. 17, 2020, which claims the benefit of United Kingdom Patent Application No. 1901077.6, filed on Jan. 25, 2019, and PCT International Patent Application No. PCT/EP2019/075027, filed on Sep. 18, 2019, the contents of which are all hereby incorporated by reference herein in their entirety.

TECHNICAL FIELD

The present invention relates to a combustion additive comprising a colloid and to a method of preparing the same. More particularly, the present invention relates to a combustion additive that can be provided in the form of a fuel additive that is added to the fuel or as a full/partial substitute for water in a water injection application or for incorporation into an air humidification method for combustion. The present teaching also relates to a method and apparatus for introducing such a colloidal solution as an additive into the combustion cycle so as to improve the efficacy of engines that are using the additive. Within the present teaching the terms "colloid", "colloidal solution" and "nanofluid" will be used interchangeably.

BACKGROUND

Metal additives such as aluminium have been used in solid form for rockets for many years as a way of increasing the performance, since they have the ability to increase the volumetric heat release of the propellants. Fine particles and microparticles of aluminium, as well as boron and zinc, have also been numerously investigated as a potential fuel additive. Cerium oxide, e.g. EP1587898A1, is known to behave as an oxygen-storing agent in the diesel exhaust catalyser.

Apart from aluminium or cerium oxide, it is also known that adding various kinds of fine metal particles into fuel can help decomposition of unburnt hydrocarbon and soot, thus reducing the amount of these pollutants emitted in the exhaust and reducing the amount of fuel used. For example, US2006/0141149A1 describes about iron oxide nanoparticle synthesis and WO2013/177512A1 (US2013/337998A1) describes about iron oxide nanoparticles for fuel additives and WO2014056790A1 about titanium oxide nanoparticles for fuel additives.

However, the metal in the fuel additive can accumulate in the combustion system, which may be harmful to it. The environmental safety of the metal nanoparticles is in question at this time. There is therefore a need for fuel additives that can actively assist in the combustion cycle yet are not contributing adversely to environmental effects, as opposed to the above examples with the nanoparticles contained by over 1 mg/L in the fuel.

Water injection or a mixture of water and ethanol/methanol injection has been attempted to improve the engine performances. Gasoline engines mainly show an improved octane number with this technology, with the result that there is an improved anti-knocking and a power enhancement effect achieved. Diesel engines mainly show a reduction of the combustion temperature with this technology, and this assists in a reduction of NOx exhaustion.

However, at the same time it is also known that water injection is generally known to enhance CO exhaustion and may reduce the fuel efficiency unless it is optimised accurately. The water aerosol size is a critical factor in this technology, since water aerosols of a big size can hinder the uniform air-fuel mixture in the combustion chamber.

The motivation of this invention is to fully/partly replace the incorporated water into combustion by a metal colloid and reducing its mixture rate to fuel than the water injections (or emulsifications) of the prior arts, so that it bears the advantages of water injection (or emulsification) and additional advantages of water-nanometal clusters but avoiding the side effects of water injection (or emulsification). In this invention, the actual nanometals/fuel ratio involved in the combustion is aimed to be less than 0.1 mg/L, which is a major difference from any prior art metal nanoparticle fuel additives.

WO2015003678A1 describes a method of operating an internal combustion engine, a turbine or jet engine and a means for introducing a fuel additive into the air passage of an internal combustion engine, a turbine or jet engine. In the method, the additive is transferred from a liquid to a droplet state and is then introduced into the fuel through an air channel during actual use of the fuel in the combustion process. As a result of directly passing a droplet form of the additive into the passage its dosage in the parts per million (ppm) range can be effectively controlled. This differs from other fuel additive arrangements where the additive is mixed directly into the fuel—either before being dispensed from retail fuel pump into the vehicle or mixed into the fuel within the fuel tank of the vehicle.

Despite these approaches there continues to be a need to develop a combustion additive that can improve the efficacy of the fuel combustion process.

SUMMARY

The present invention has been made in order to solve the problems of the prior art as described above, and in accordance with the present teaching there is provided an aqueous alkaline solution dispersing fine metal particles that can be usefully used as a fuel additive or a full/partial substitute for water in a water injection system or as an air humidification component used in combustion processes. The dimensions of the fine metal particles are such that the aqueous alkaline solution dispersing fine metal particles can be considered a nanofluid composition or a colloid. In addition to the colloid itself, the present teaching also provides an injection system whereby the colloid is actively injected into the fuel stream during the combustion process. As detailed above, within the context of the present teaching the terms "colloid", "colloidal solution" and "nanofluid" will be used interchangeably.

The colloid preferably comprises water as a main component.

It is preferable that the colloid has a pH value of 8.0 to 12.5 in the state after the fabrication process. The colloid preferably shows a DC conductivity of 5 to 13 mS/cm. The colloid preferably shows a surface tension of 50 to 70 mN/m. It is preferable that the colloid, when fabricated, has an ammonia/ammonium value of 3 to 10 mg/L.

The colloid preferably has a Total Dissolved Solid (TDS) value of 1500 to 3500 ppm in the state after the fabrication process. The main dissolved alkali metal ion is desirably sodium and preferably with a concentration of 1500 to 3000 mg/L.

The total amount of other metal components within the colloid after finishing the fabrication process is preferably 0.5 to 200 mg/L. The metal particles within the colloidal solution preferably have an average size range of between 30 nm to 30 μm.

The present invention also provides a method for preparing a colloid for a combustion additive, wherein the metal components are eluted from stainless steel electrodes, formed fine particles and dispersed in the aqueous solution. It is preferred that the electrolysis process is performed using power of 1 to 3 W per 5 L of the composition.

The present invention also provides a method for using the colloid as a combustion additive, wherein the colloid or its mixture with water and/or water miscible solvents and/or hydrogen peroxide and/or sodium percarbonate is injected through an air inlet or added directly to a fuel.

The injection method is preferably via an air intake path or is achieved by directly spraying the additive into the combustion system. The combustion additive injection amount can be controlled via one or more nozzles and/or valves and/or the atomiser power. The colloid or its mixture with water/solvent can be atomised via a carburettor or an ultrasonic vibrator or an air bubbler or a sprayer or other droplet methods. The colloid or its mixture with water and/or water miscible solvents and/or hydrogen peroxide and/or sodium percarbonate can be used with commercial water or water/solvent injection devices. The injection devices may comprise a temperature controller and an ioniser.

The dosing ratio of water insoluble fuel:additive is typically 100:1 to 1,000:1 and can vary outside this range according to the combustion system and the purpose of combustion additive.

The sludge by-product may be filtered out of the colloid as the last step of the fabrication process and can be preferably utilised as a constituent of a mineral fertiliser, a raw material for electrets (constant voltage capacitor), a photo-sensitive material of solar cells, a raw material for photo-sensitive capacitors, a charge separating material for electro-kinetic power generation and/or a catalyser material of fuel cells.

The colloid can be utilised as the flowing fluid for electro-kinetic power generation.

These and other features will be better understood with reference to the following exemplary arrangements which are useful for a better understanding of the present teaching.

BRIEF DESCRIPTION OF THE DRAWINGS

FIG. 1A is a schematic showing a colloid in accordance with the present teaching.

FIG. 1B is a schematic showing changes in intensity of a flame generated when a colloid prepared according to an embodiment of the present invention is sprayed onto a butane gas flame.

FIG. 2 is a graph showing the results of measurement of the voltage-current characteristics of the colloid prepared by the method of the present invention. The electrodes used for this test are the same as the electrolytic cell used for preparing the colloid.

FIG. 3 is a schematic view showing a method of injecting a combustion additive prepared according to an embodiment of the present invention into an air injection port of a combustion system using a tubular body such as an injection needle or a tube.

FIG. 4 is a schematic view showing a method of injecting a combustion additive by connecting a combustion additive prepared according to an embodiment of the present invention to a combustion additive vessel (additive container) through a valve/nozzle into an air inlet port.

FIG. 5 is a schematic view showing that a combustion additive prepared according to an embodiment of the present invention is accommodated in a container having micropores and is installed on one side of an air inlet.

FIG. 6 shows an injection system schematic configured to provide a mixing of air and the combustion additive vapour/aerosol/mist prior to introduction to the combustion chamber.

FIG. 7 shows a variant injection system schematic configured to provide a mixing of air and the combustion additive vapour/aerosol/mist prior to introduction to the combustion chamber.

FIG. 8 shows an injection system schematic similar to FIG. 6 but configured to provide a mixed air and the combustion additive vapour/aerosol/mist directly into the combustion chamber.

FIG. 9 shows an injection system schematic similar to FIG. 7 but configured to provide a mixed air and the combustion additive vapour/aerosol/mist directly into the combustion chamber.

FIG. 10 is a schematic view showing a method of injecting a combustion additive prepared according to an embodiment of the present invention into an engine by mixing the fuel with a bubbler method.

FIG. 11 is a schematic diagram showing a typical electrolytic cell that may be used to fabricate a colloid in accordance with the present teaching.

DETAILED DESCRIPTION OF THE INVENTION

Hereinafter, the present invention will be described in more detail based on preferred embodiments and drawings.

The present invention discloses an alkaline aqueous solution in which fine metal particles are dispersed within the solution so as to form a colloid. The colloid can be usefully used as a combustion additive or as a full/partial substitute for water in a water injection process or as an input constituent into an air humidification system used as part of a combustion process. The present teaching also extends to a method of electrolysing an aqueous solution, in which fine metal particles are dispersed to produce such a combustion additive. The aqueous colloidal solution exhibits unique electrostatic charging behaviour and combustion enhancement behaviour.

Per the present teaching, and as shown in the exemplar arrangement of FIG. 1A, the colloid comprises a fine metal particle 110 that forms the core of a combined fine metal particle and water 120 cluster 100. In this arrangement the fine metal particle and water cluster 100 can be delivered in a vapour/aerosol/mist phase and desirably exhibit a charged exterior surface.

The water cluster 100 is desirably formed using an alkaline base and this alkaline aqueous base provides a suppressed growth rate of metal oxide layer, which is an advantage for a fine metal particle. The metal particles 110 maintain a thin oxide layers since they are generated in an alkaline solution through an electrolysis methodology and are kept in an optimally alkaline solution before they are delivered into the combustion environment.

As a result of the charged effect of the composition, and due to the Coulomb repulsion effects, the charged cluster does not agglomerate and stays as a fine mist form and mixes with air uniformly when it is atomised. The electrostatic characteristic of the cluster prevents water from entrapping the fuel, therefore air/fuel ratio stays the same which has no detrimental effect on the expected combustion process or efficiency.

Figure 3:
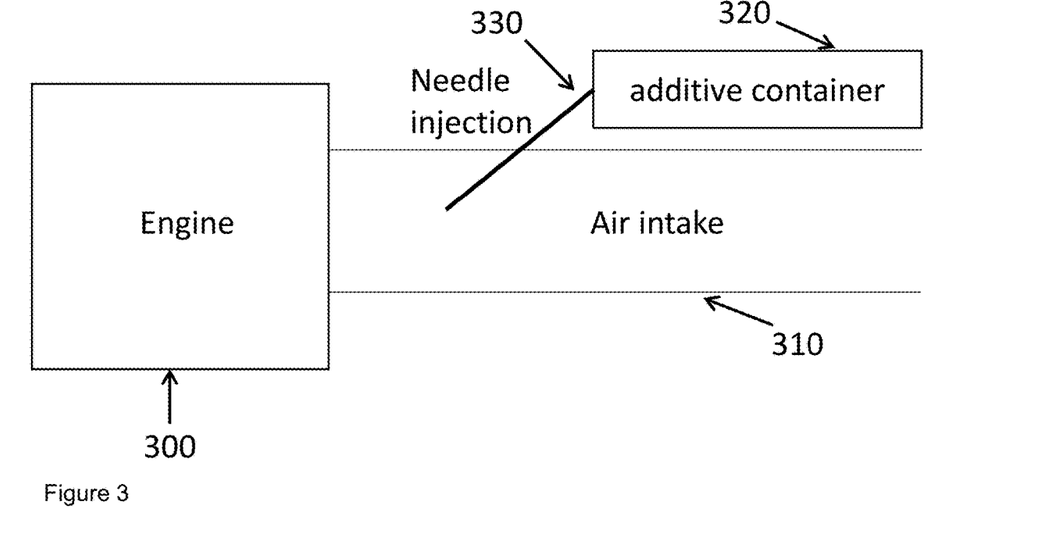
Figure 4:
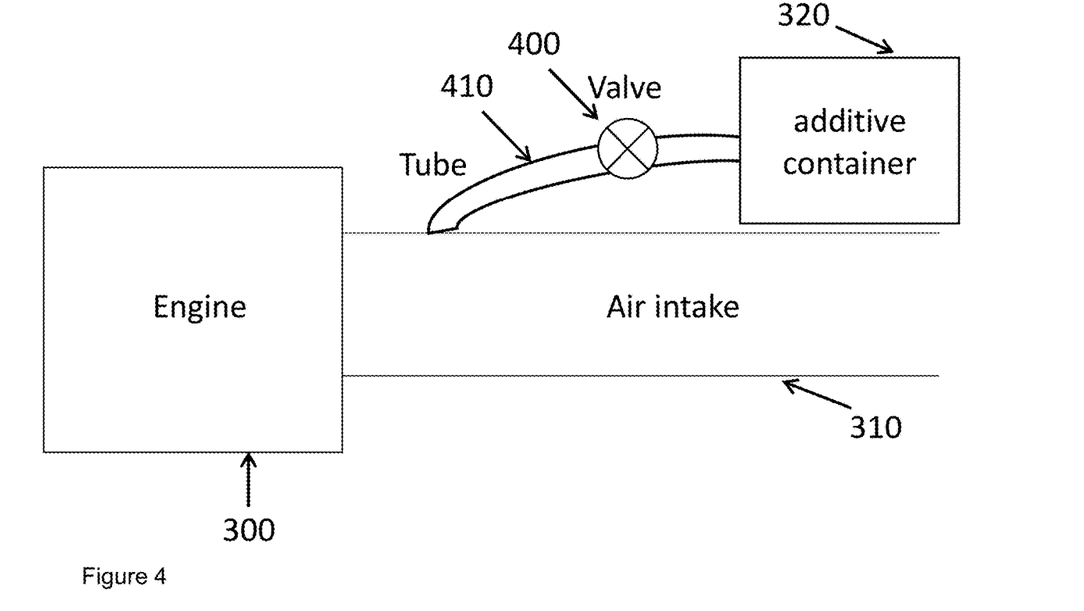
Figure 5:
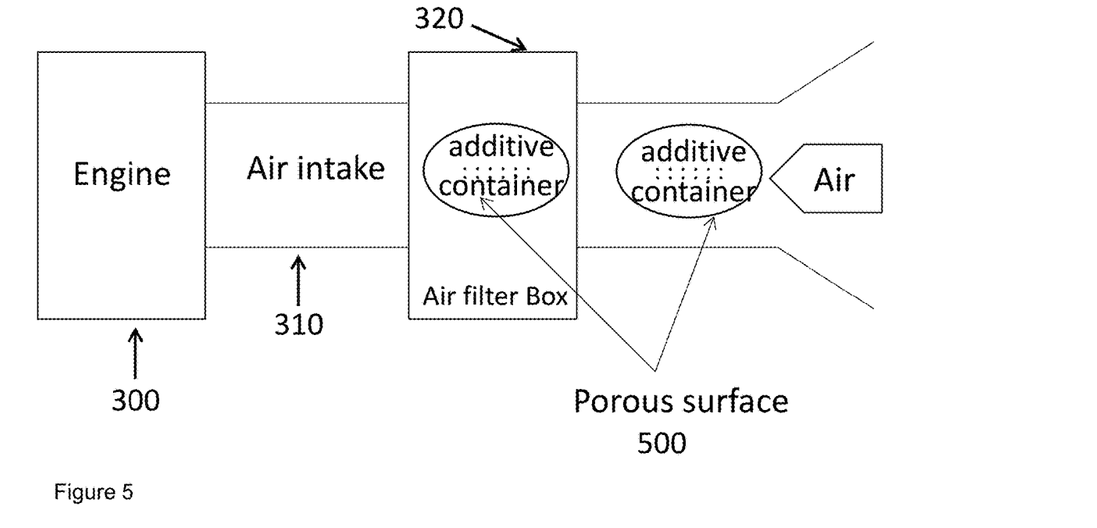

Once introduced into a combustion chamber, such as the combustion chamber exemplified by the engines 300 of FIGS. 3 to 5 or the more generically described chambers 300 of FIGS. 6 to 9, as the temperature and pressure of the combustion chamber increases, an explosive breaking of the cluster prior to the main explosion will spread the water and metal particles in the chamber uniformly. This explosive migration and collision will enhance the uniformity of air-fuel mixture in the chamber.

Therefore combustion is enhanced. In this cluster breaking process, some water molecule can create hydrogen, which will assist with clean burning. Concurrently with this explosive breaking, the resultant heat is absorbed by the water or the cluster. Therefore the combustion temperature would be lower, while the mechanical movement in the combustion chamber is not reduced.

Furthermore, the alkali metal ions remove particle precursors. The alkali metals inhibit the nucleation of particle precursors showing detergent effects.

EXAMPLES

In order to prepare the colloid according to the present invention, an electrolysis method in an alkaline aqueous solution was introduced, and erosion of the metal electrode was induced so that the fine metal particles are contained in the aqueous solution.

Figure 11:
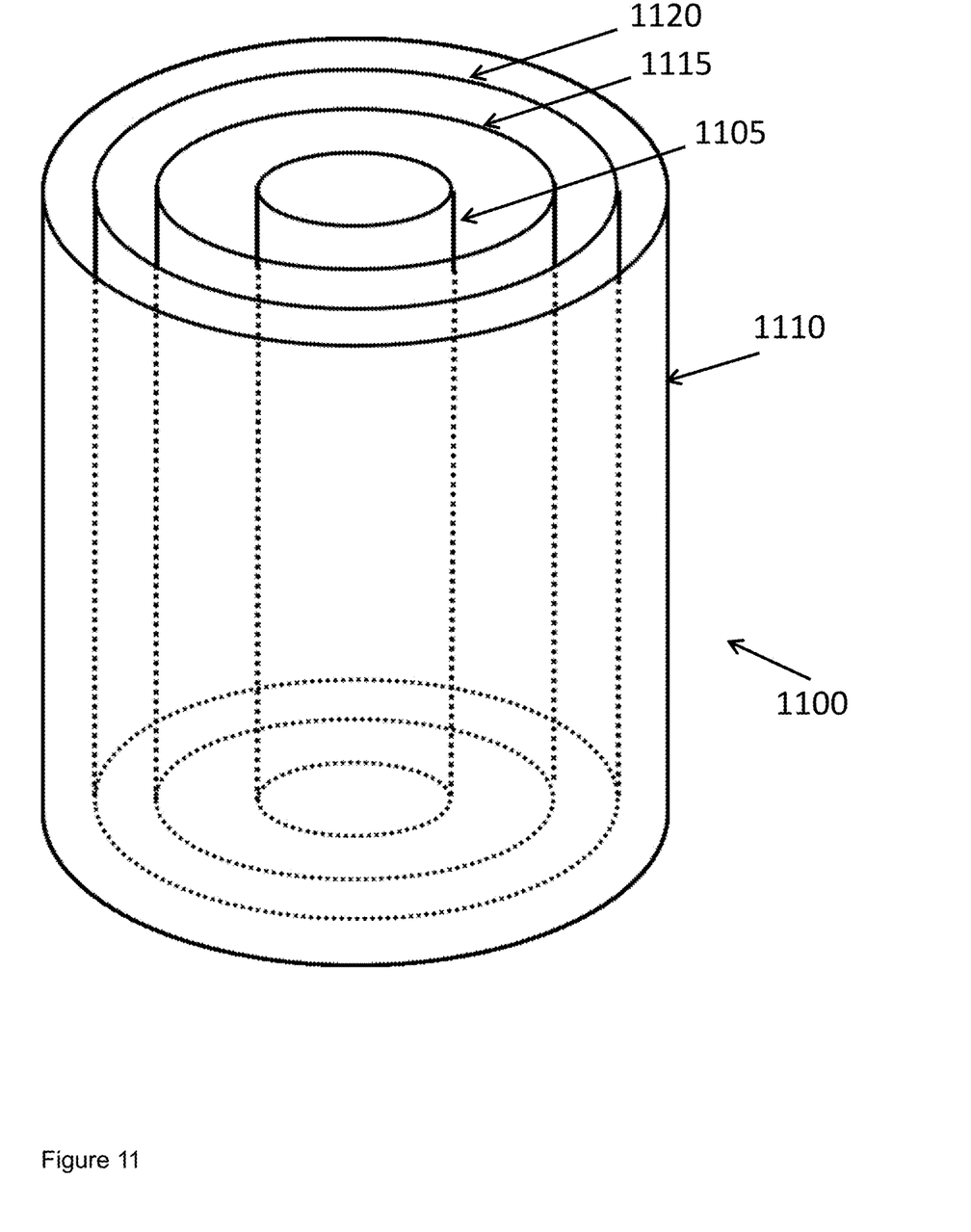

In the apparatus for electrolysis, such as the apparatus 1100 referenced in FIG. 11, the electrode 1105, 1115, 1110, 1120 contains an iron component, and is preferably non-magnetic (food grade) stainless steel. An example of suitable stainless steel that can be used within the context of the present teaching is 316L stainless steel. The stainless steel electrode provides constituent materials for the fine metal particles that are ultimately present in the colloid. In other words, the fine metal particles that are produced include the components of the stainless steel. It is believed that the detailed quantity of the various metal components in the stainless steel is irrelevant to the performance as a combustion additive, since the purpose of choosing a stainless steel (e.g. 316L) is to provide a slow elution process to form water-nanometal clusters during the electrolysis. It will be appreciated that stainless steel is typically used because of its anti-corrosive characteristics. The present inventor has realised however that in the context of electrolysis that stainless steel does corrode, albeit very slowly. Taking advantage of this slow corrosion, the use of stainless steel as an electrode component facilitates the slow introduction of metal particles into solution. The actual metal particles that are introduced are not considered critical; what is important is that there is a mechanism to ultimately provide metal constituents having a total concentration of 0.5 to 200 mg/L within the final colloid of the present teaching.

The electrolytic cell 1100 is in the form of a cylinder, and the electrodes are stacked to form a multi-layered structure. An inner electrode 1105 is desirably dimensioned smaller than the outer most electrode 1110, and the smaller-sized electrode 1105 is located inside the larger-sized electrode 1120. The inner electrode 1105 is typically coupled to a negative pole and to ground. The outermost electrode 1110 is connected to a plus pole. In this exemplary arrangement, intermediary electrodes 1115, 1120 are provided between the inner 1105 and outer 1110 electrodes and their potential is a floating potential. Spacers which are chemically inactive in the electrolysis process are provided between the electrodes to maintain their relative separation.

The gap between the electrodes is 5 to 15 mm, and the spacers/separator provided between the electrodes must be chemically inert or durable in the electrolysis process.

In addition, the electrode 1105 of the deepest portion is connected to the cathode and the ground respectively, and the outermost electrode 1110 is connected to the anode. Other electrodes are electrically insulated between the positive electrode and the negative electrode.

The use of electrolysis is a well-known technology, and a detailed description of the configuration of the electrolytic cell will be omitted. That notwithstanding it will be seen that the structure of the electrode cell of FIG. 11 is preferably cylinder. If it is dimensioned to receive about 5 L of water, it is desirable to place the 2 neutral cylinders 1115, 1120 between the anode 1105 and the cathode 1110. The main erosion happens in anode cylinder 1105 and the eluted material becomes dispersed as particles. Using such an arrangement with stainless steel electrodes an exemplary electrolysis process will now be described.

A solution comprising water, ethanol and ammonia/ammonium is introduced into the electrolytic cell. It will be appreciated that ethanol is an example of a suitable alcohol that can be used within the context of the present teaching and other alcohols such as, for example, methanol could also be considered. The main electrolyte constituent used is NaCl and the minor electrolyte can include $NaHCO_3$, $Na_2CO_3$ and other various metal salts. The solution can contain powder of various quartz minerals. The solution can contain Mg and Zn. Ethanol mixture to the water is preferably 0.5 to 1.5% by volume of the water.

To supply ammonia/ammonium to the solution, human or any similar animal urine can be used. If the urine is used, the pH value is preferably 5 to 6 and mixed into water at 0.5 to 2% by volume of the water. The urine can be replaced by a urea solution. The ammonia/ammonium value before starting the electrolysis process can vary from 2 to 5 mg/L before the fabrication process. During the fabrication process the alcohol is evaporated and a nitrogen constituent of the urea and/or uric acid is retained in its ammonic form (NH3/NH4+).

Mg and Zn can be added to the solution as a salt form. Mg is added 100 to 300 mg/L and Zn is added 0 to 100 mg/L of the water.

The electrolyte is added at a ratio of 2 to 8 g/L of the water. One can use a ready-made mixture of various salts and quartz minerals, e.g. an alkaline salt such that sold under the trade mark MeineBase salt.

In a preferred arrangement, the total dissolved solid, TDS, value before starting the electrolysis process varies 1500 to 2500 mg/L at 20° C. If salt is out of the upper limit, there is a potential problem of excessive corrosion of the electrode, and to avoid this a powder material, such as quartz, should be added in the upper range to help ensure that fine metal particles do not agglomerate and also that the electrode will ultimately corrode within a desired size range.

The starting solution has a pH value of 8.5 to 9.5 in the starting state in which the metal particles are not contained. The selection of this alkaline solution in this pH range is considered an important factor that must be controlled in order to ensure that surface oxide films of the fine metal particles are formed thinly. The present inventor has realised that if the above range is exceeded, the electrolysis reaction becomes excessively rapid. Within the above range, the alkalinity is optimal to suppress oxidation of metal particles such as iron. In the context of a fuel additive, it will be appreciated that the surface oxidation of any metal constituent should be minimised to ensure an efficient catalytic effect in combustion.

The amount of dissolved sodium can vary from between 1500 to 3000 mg/L and the total amount of other metal ions and the dispersed metal particles after finishing the fabrication process can vary between 0.5 to 200 mg/L as measured by Inductive Coupled Plasma Optical Spectroscopy.

Having introduced the electrolyte solution into the electrolytic cell, the electrolysis uses on/off DC current with on time of 4 to 6, typically 5 sec and off time of between 8 to 12, typically 10 sec, or the frequency can be adjusted keeping the duty ratio fixed at 30 to 80%. The current at or during the on time is preferably 0.4 to 0.8 A and the voltage should be controlled to have the desirable power consumption of 3 to 9 W at on-time per 5 L of solution, therefore the averaged power consumption is 1 to 3 W per 5 L of solution. In this case, it is difficult to generate fine metal particles when the lower limit is exceeded, and excessive electrode corrosion occurs when the upper limit is exceeded.

The electrolysis solution temperature is preferably maintained at 30 to 45° C. The electrolysis process continues preferably for a period of between 18 to 24 days. It will be appreciated that the actual temperature chosen is a contributing factor in the efficiency of the electrolysis. If the temperature is too high, then the evaporation rates over the extended periods that are used in the context of the present teaching are too high. If the temperatures chosen are too low, then the actual efficiency of the electrolysis is affected and the time period that is required may need to be increased.

It is also desirable to prevent the evaporated solution does not flow back to the electrolysing bath as this may affect the clustering effect that is taking place within the fluid bath.

Post processing, the sludge of the electrolysis process must be filtered out by a filter paper with pore diameter of 0.5 to 50 μm. As discussed below, the sludge may be advantageously used for other applications. As an indicator of the volume of sludge material that is associated with the process of the present teaching, when 5 L of water was used in the beginning, 2.5 to 3.5 L of solution remains after finishing the process due to evaporation and filtering process.

Figure 1A:
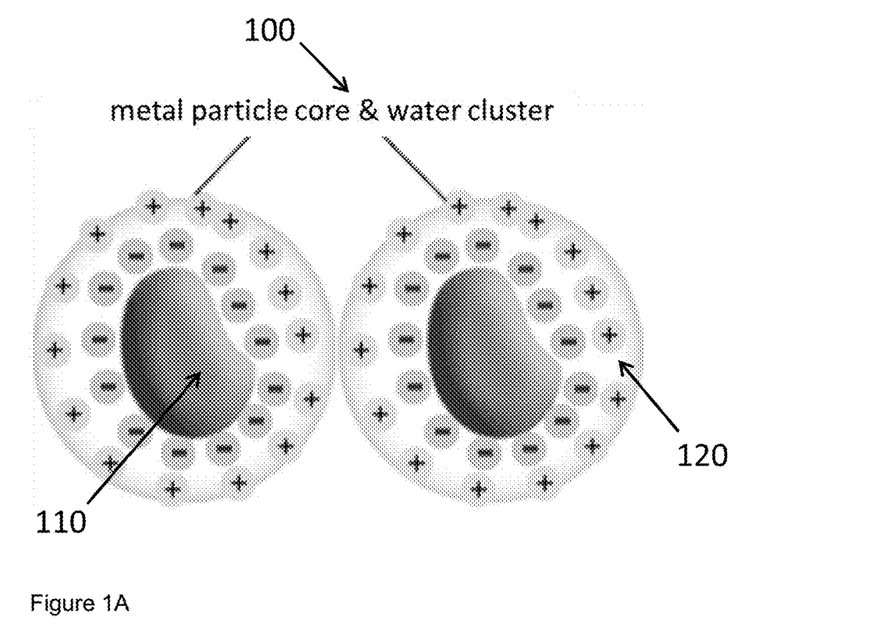

The chemical characteristics of the colloid solution after finishing the electrolysis and filtering processes are preferably in the range pH 8.0 to 12.5, TDS 1500 to 3500 ppm, ammonia/ammonium 3 to 10 mg/L, DC conductivity 5 to 13 mS/cm and surface tension 50 to 70 mN/m. It will be understood that these final chemical values of the colloid solution are closely related to the values of the starting electrolytic solution. The characteristics are an outcome of the optimal electrolysis conditions which have been identified by the present inventor to create water-nanometal clusters—such as those exemplified with reference to FIG. 1—with a minimum quantity of fine metal particles.

In addition, it is preferable that the pH of the colloidal solution after the fabrication process is completed has a value of 8.0 to 12.5, meaning that the upper limit is set to 12.5 so as to prevent the reoxidation of the metal particles. That is, when the pH exceeds 12.5, the metal particles (for example, iron) may start to be oxidized again. As stated above, such oxidation could have a detrimental effect in the overall combustion process when the additive is added into the combustion process. In the context of reduced pH values, the present inventor has identified that the stability of the colloid is affected detrimentally—as a result of agglomeration of the metal particles in the colloid to larger particles that ultimately sediment out of the colloid. Therefore, the pH should not exceed 12.5 or be reduced towards acidic values. In order to maintain the pH within the limit, the pH value of the starting electrolysis solution should be maintained within the range described above. Therefore, the pH value of the colloidal solution has its critical significance in the above range.

As a result of carrying out the electrolysis process, by-products are generated separately from the production of the fuel composition, and these by-products are of value for recycling. This by-product sludge can be utilised as mineral fertiliser, electret (constant voltage capacitor), photo-sensitive material for solar cells, photo-sensitive capacitor, a charge separating material for electro-kinetic power generation, and/or the catalyser for fuel cells.

The characteristic of the aqueous metal colloid is sensitive to the temperature and/or pressure for operation and also for storage. The finished colloid should be kept sealed in the dark with the preferred temperature of 5 to 27° C. Outside the range, the particles and ions agglomeration rate and fungi growth rate increase therefore the colloid degrades quickly. When the colloidal solution is atomised, the vapour/aerosol/mist has to be generated at 10 to 25° C. Below the lower limit, the cluster disturbs the heat expansion in the combustion cycle and above the upper limit, it the cluster will not be formed ideally.

Once the colloidal solution is formed, it can be mixed with water, water miscible solvents and/or hydrogen peroxide and/or sodium percarbonate, for its stability and boosted catalytic effect for combustion.

Evaluation Examples

Table 1 shows preferred concentration ranges of the main metals that are incorporated in the colloid through the electrolysis process in accordance with the teaching of the present invention. The measurement was performed for several samples fabricated by the preferred setup of this invention by Inductively Coupled Plasma Optical Spectroscopy. In the table, sodium is attributed from the electrolyte and other elements are attributed from elution of the electrodes of the preferred setup of this invention. In this set up, the electrodes were 316L stainless steel and it is believed that each of Al, Cr, Fe and Ni are constituents of this type of stainless steel. It is believed that the actual make-up of any stainless steel depends on manufacturing preferences.

TABLE 1

| | Element | | | | |
|---|---|---|---|---|---|
| | Aluminium | Chromium | Iron | Sodium | Nickel |
| mg/L | 0.3~0.7 | 0.05~0.3 | 0.05~0.2 | 1800~2400 | 0.1~0.8 |

Table 1 shows distinctively low metal concentration except sodium. When the colloidal additive in Table 1 are mixed with fuel with a ratio of fuel/additive=100 to 1000, the hazardous metal concentration in the fuel becomes far less than 0.1 mg/L. This demonstrates a main difference from the prior art metal nanoparticle fuel additives, that catalyse combustion by the included metal nanoparticles themselves. In contrast, per the present teaching water-nanometal clusters are utilised as opposed to the actual metal particles of the prior art approaches. In this way, the efficiency of the combustion enhancement that is provided by the additive is not restricted to the actual type of metal, that forms the core of the water-nanometal clusters. Per the present teaching, any kind of fine metal can be used in distinctively suppressed amounts as long as it shows a pronounced water-nanometal clustering effect. It is believed that the function of the metal constituents of these dimensions is to form a metal core of the formed water-nanometal cluster, a schematic of which was shown in FIG. 1A.

Table 2 below shows the mean particle radius range of the colloidal solution prepared according to the present invention using Dynamic Imaging Particle Analysis (DIPA) and Dynamic Light Scattering (DLS) for several samples fabricated by the preferred setup of this invention.

TABLE 2

| DIPA (μm) | 3~21 |
|---|---|
| DLS (nm) | 40~130 |

The eluted metal elements from the electrode form fine particles during the electrolysis process of the preferred setup in this invention and also a slow agglomeration happens after the fabrication is finished. Due to these reasons, the colloid shows a wide range of particle size.

It will be understood that the identified characteristics of the exemplary colloid fabricated in accordance with the present teaching (the metal constituents identified in Table 1, and the particle sizes of Table 2) include ranges in both percentage and dimensions. Sample colloids per these ranges were then used in characterisations and performance testings, as will be explained further below.

Figure 1B:
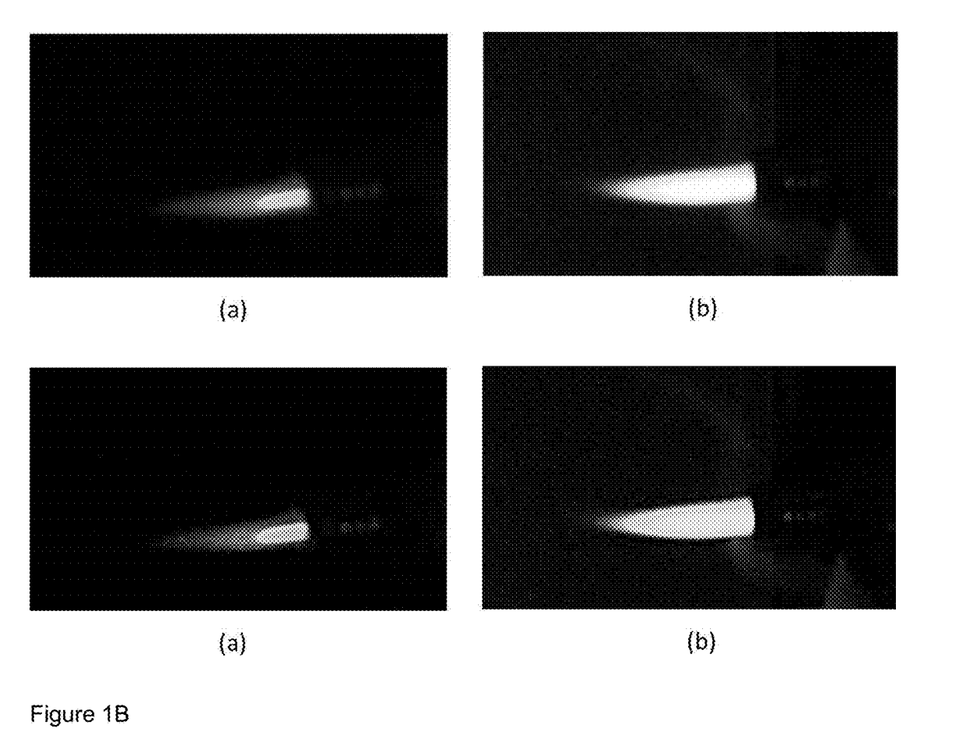
Figure 2:
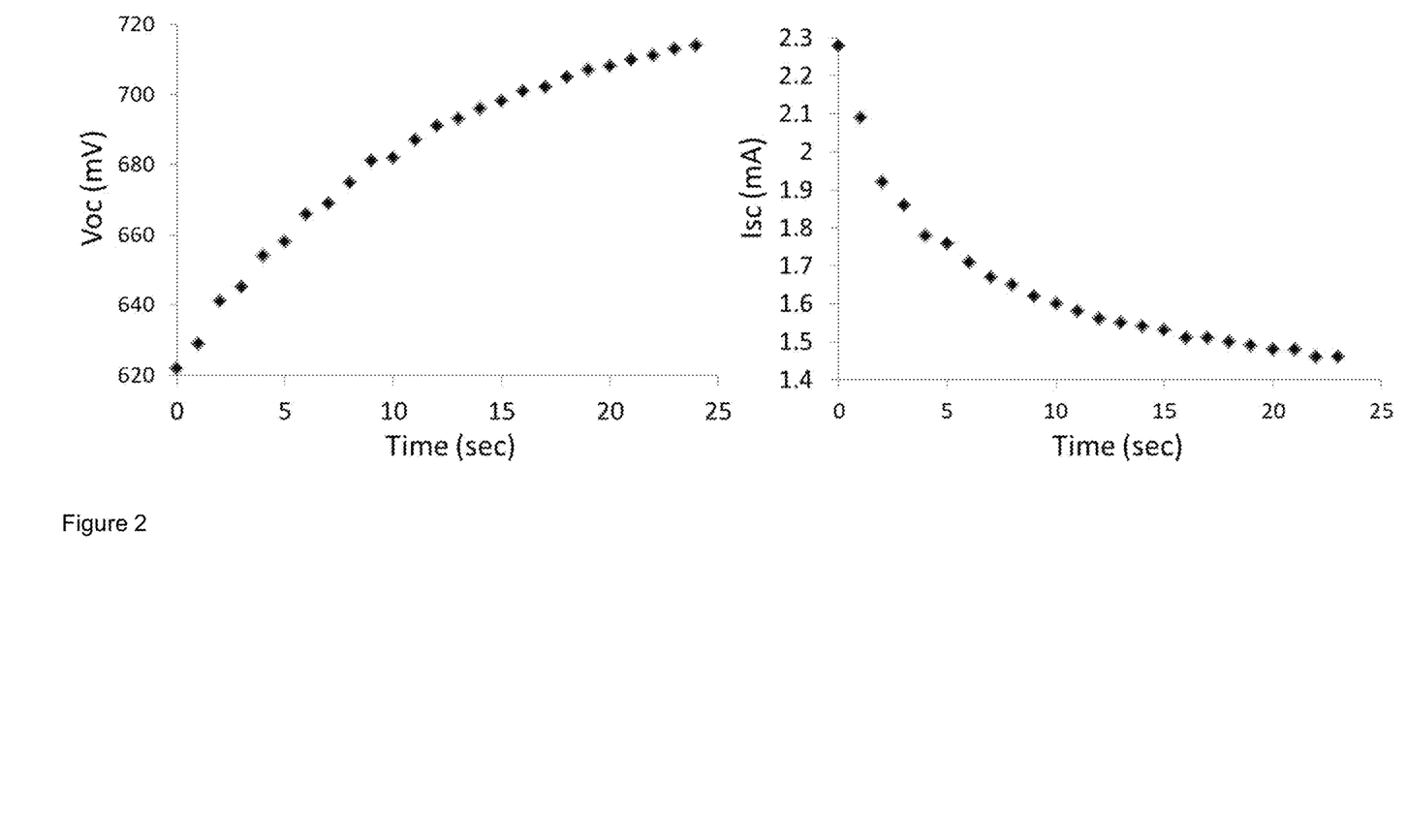

FIG. 1B is a schematic showing changes in intensity of a flame generated when a colloidal solution prepared according to an embodiment of the present invention is sprayed onto a flame.

As shown in FIG. 1B, the butane gas flame intensity of the lighter differs between (a) before applying the colloidal solution of the present invention and (b) the supply of the atomised colloidal solution, respectively.

The brightness of the flame became brighter as the atomised aqueous solution was supplied. At this time, the fine metal particles and the metal ions of the aqueous solution were burned, and the colour change to yellow occurred.

FIG. 2 shows the electrical behaviour of the colloidal solution prepared in accordance with an embodiment of the present invention in an open state and in a short circuit state without supplying an external current.

The fine metal particles in the aqueous solution draws the electric charge around it, and when the electrode is connected, an electrostatic potential is formed on the electrodes. As shown in the left graph of FIG. 2, in the open, an electrostatic potential is formed in the system. As shown in the right graph of FIG. 2, when the short circuit current Isc starts from a maximum of 2.3 mA, and approaching a balanced point where the charge is drawn from the periphery and consumed by the short circuit. This operating state can be repeated. With this charge separation characteristics, the colloid can be also utilised as the flowing fluid of electrokinetic power generation.

The principle of operation when a colloidal solution is used as a combustion additive is as follows.

When a colloidal solution is introduced into an internal combustion engine, the colloidal solution heats up, the water-nanometal cluster breaks explosively, spreading uniformly in the combustion chamber. When the metal particles are dispersed in an appropriate level in the air, the ignition of the fuel is uniformly spread in the chamber or the cylinder, thereby increasing the combustion efficiency. Also, the charge generated in the aqueous solution and generated during atomisation is discharged in the chamber or the cylinder to help the ignition process. Taking this into consideration, the amount of energy required for combustion can be reduced by introducing the additive. When the additive is supplied in an injected manner through the air inlet or directly into the chamber, it becomes more energy-efficient than when it is mixed directly into the fuel tank, which makes it easier to contact the cluster in the air with higher degrees of freedom thus the reaction can proceed more actively.

FIGS. 3 to 5 illustrate a method of supplying a colloidal solution or its mixture with water/solvent/hydrogen peroxide/sodium percarbonate as an additive to an internal combustion engine in embodiments.

A combustion system, such as an automobile, a ship, an aircraft, a generator, a boiler, etc., may be equipped with a dosing system for allowing the combustion additive of the present invention to mix with fuel through an air inlet. At this time, it is possible to provide a control unit for controlling the amount of injection according to temperature, fuel injection rate, air flow rate, torque, and number of revolutions per minute (rpm) of the engine or the like, or use a tubular body such as a needle for main use connected to the air inlet.

FIG. 3 is a schematic view showing a method of injecting a combustion additive prepared according to an embodiment of the present invention into an air injection port 310 and then into an engine 300 of a combustion system using a main body of a needle 330, tube, or the like. The combustion additive is initially provided in a container 320. In order to precisely adjust the addition ratio of the additive, the diameter of the tubular body should be properly adjusted. The diameter of the tube is related to the flow rate. If there is no space in the container 320 within which the combustion additive is provided, a connection tube may be interposed between the container and the tube.

In a variation where similar components are described with the same reference numerals, FIG. 4 is a schematic view showing a method of injecting a combustion additive of the present invention by connecting a combustion additive prepared according to an embodiment of the present invention with a tube 410 through a flow control valve 400 from an additive container 320 (colloid container) to an air inlet port 310. The tubular body may be composed of a tube, a pipe, or the like. In addition, a control unit for controlling the flow rate control valve may be separately provided.

The mixing ratio of the air and the combustion additive can be varied by adjusting the flow control valve 400 between the combustion additive container 320 and the air inlet 310. The flow control valve or controller is connected via a tubular body, but may also be connected directly to the vessel.

It can also be controlled by a temperature controller, and/or an ultrasonic vibrator and/or a pressure regulator that keeps the atomisation rate constant. In the context of temperature controller, the present inventor has identified keeping the temperature of the introduced composition in the range 10 to 25° C. is particularly advantageous. During storage i.e. pre-introduction to the air stream, it is desirable to have a temperature controller of the liquid container configured to maintain the liquid at temperatures within the range of 5 to 27° C. to avoid a rapid degradation of the colloid.

This mixing ratio is determined by considering the positive catalytic effect of the cluster and the negative effect of the water vapour/aerosol/mist which disturbs air-fuel mixture. The dosing ratio of water insoluble fuel:additive can vary 100:1 to 1,000:1 initially. As the combustion additive effect settles in the combustion system, the dosing ratio can be reduced to 50,000:1. In case of using water soluble fuel as the main fuel, the mixing ratio can vary more flexibly and purposefully, and it can go up to 1:4, where the colloid is consumed more than the fuel itself.

The conditioning system may be installed in the combustion additive container portion. This stabilizes the air/fuel mixing ratio and the aerosol (mist) size. In this way, the combustion additive injection amount can be controlled via one or more nozzles and/or valves and/or the atomiser power according to the amount of the air flow and the fuel injection. In other configurations, its rate of introduction can be varied in accordance with sensed variation in engine performance such as engine rpm and/or the torque.

FIG. 5 is a schematic view showing that a combustion additive prepared according to an embodiment of the present invention is accommodated in a container 320 having micropores 500 and is simply installed at one side of the air inlet.

As shown, the combustion additive of the present invention can be discharged through the micropores from the vessel by the pressure in the air injection tube, from which colloid can be supplied to the fuel.

More specifically, the method of injecting the combustion additive of the present invention through the air inlet comprises providing a housing 320 having a fine pore channel 500 on one side of the air inlet, housing the composition in the housing, and applying the vibration to the colloid. Subsequent to the vibration to the colloid, the container can be pressurised through the introduction of air which causes a subsequent discharge of the combustion additive through the air inlet 310 and into the fuel channel. Here, the vibration is, for example, a vibration generated by an engine or a vehicle, but it is not necessarily limited thereto, and the vibration may be artificially applied.

Meanwhile, the method of injecting an atomised combustion additive through the air inlet may be performed by a water mist generating device or an air bubbler or an aerosol spraying device other than the enclosure, and the enclosure, the mist generating device or the air bubbler or the aerosol spraying device can be installed in the air filter box of the air inlet.

The mist generator or the air bubbler or the aerosol spraying device itself is a known technology, so a detailed description thereof will be omitted.

Figure 6:
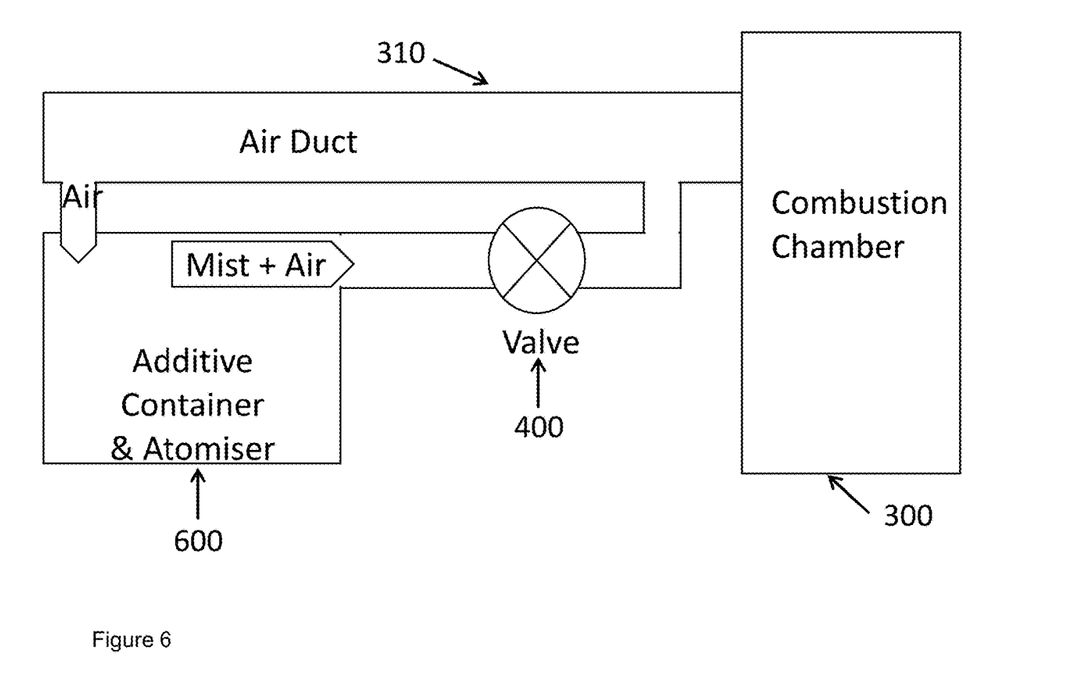
Figure 7:
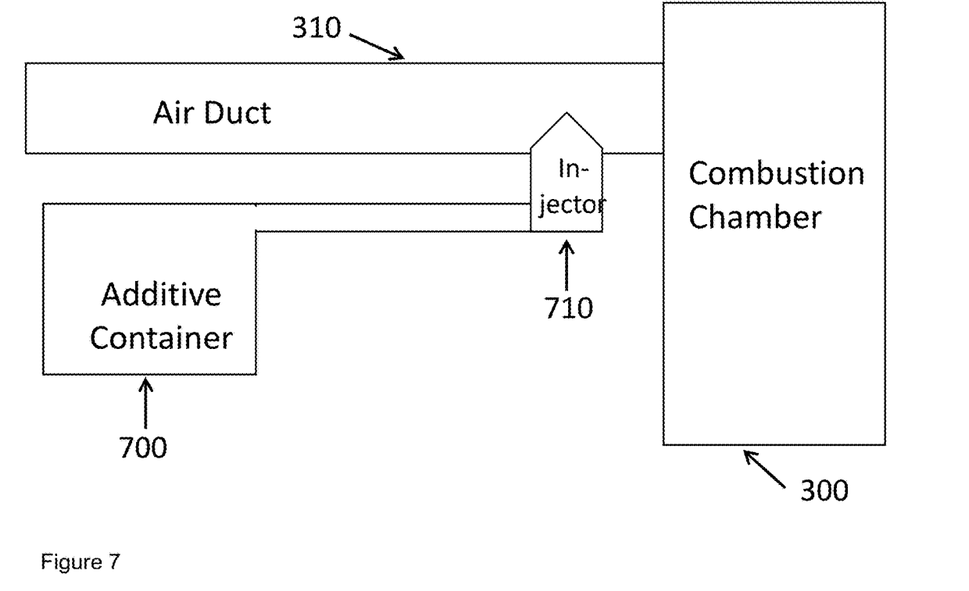

FIGS. 6 and 7 show alternatives to that of FIG. 3 to FIG. 5 where the combustion additive is provided into the air duct 310. In both configurations, the composition is injected into the air duct, preferably after a lambda probe 400 and nearest to the combustion chamber 300. In FIG. 6 the combustion additive container and the atomiser can be separated or embedded in a bottle 600. The method of how to achieve the necessary atomisation can be for example through use of a carburettor, an ultrasonic vibrator or a bubbler, where fine size mist or aerosol is created under a low temperature. A part of the air from the air duct flows through the atomiser and mixes with the combustion additive vapour/aerosol/mist. The temperature controller can be embedded in the atomiser and the container. The ioniser can be embedded in the atomiser.

Figure 8:
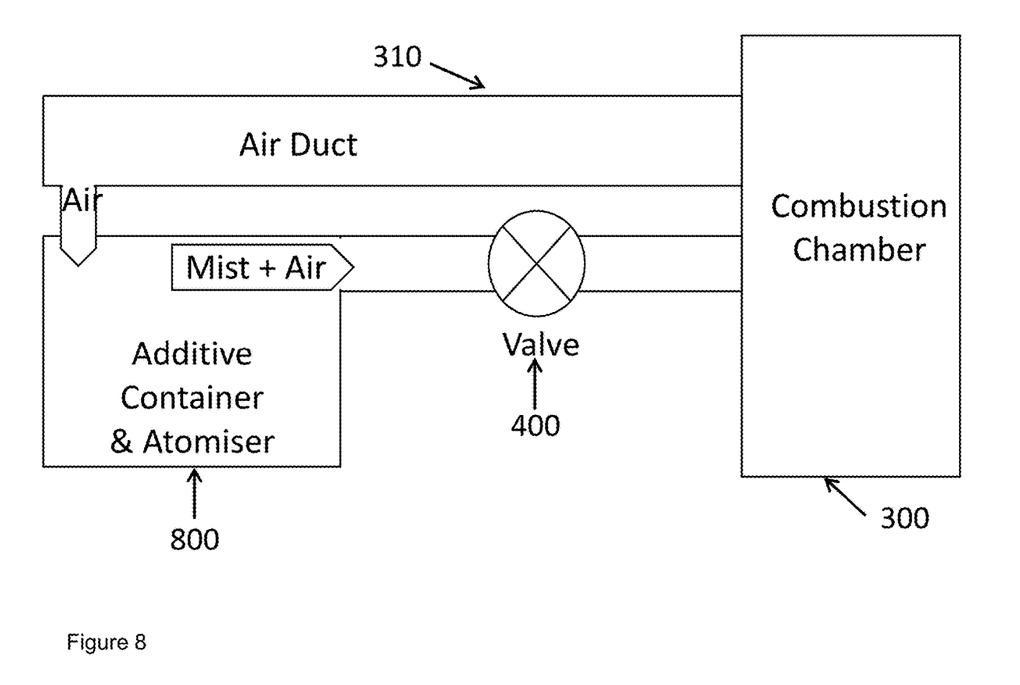
Figure 9:
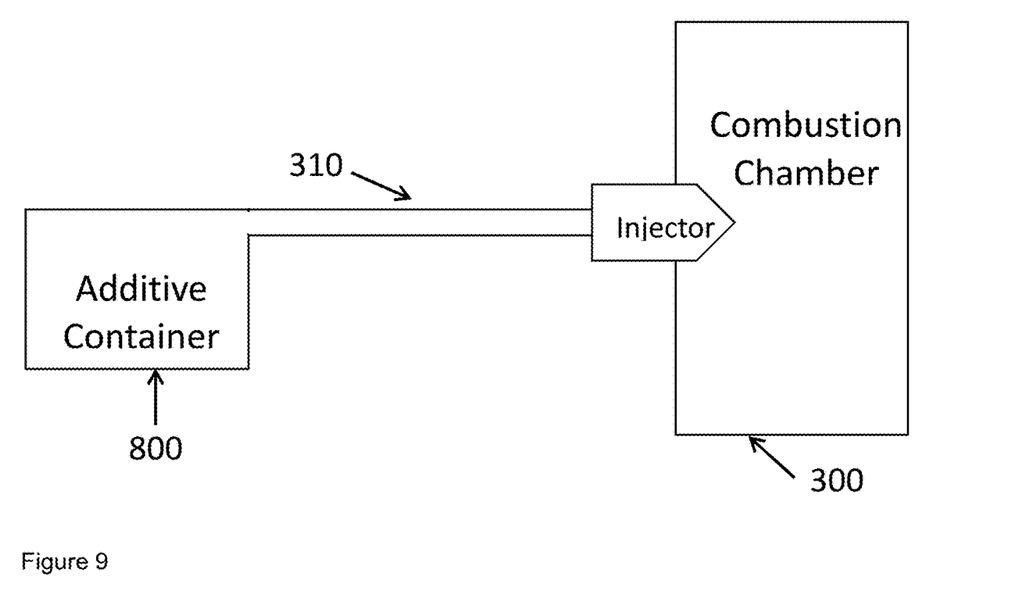

In FIG. 7, the injection method can be pressure driven spray, ultrasonic vibration, capillary motion driven droplet via a porous material or weight driven droplet via a needle 710. The injector 710 can have an ioniser, which functions similarly to electrostatic spray guns. In this scheme, the temperature controller can be installed in the container 700 or in the line between the container and the injector FIGS. 8 and 9 show two further variations, where in FIG. 8 there is detailed an injection system that facilitates a mixing of the air and the combustion additive vapour/aerosol/mist 800 prior to injecting the mixture directly into the combustion chamber 300 via a valve 400. FIG. 9 uses a similar mechanism to that of FIG. 7 in that the injection method can be pressure driven spray, ultrasonic vibration but differs in that it injects the additive directly into the combustion chamber.

Figure 10:
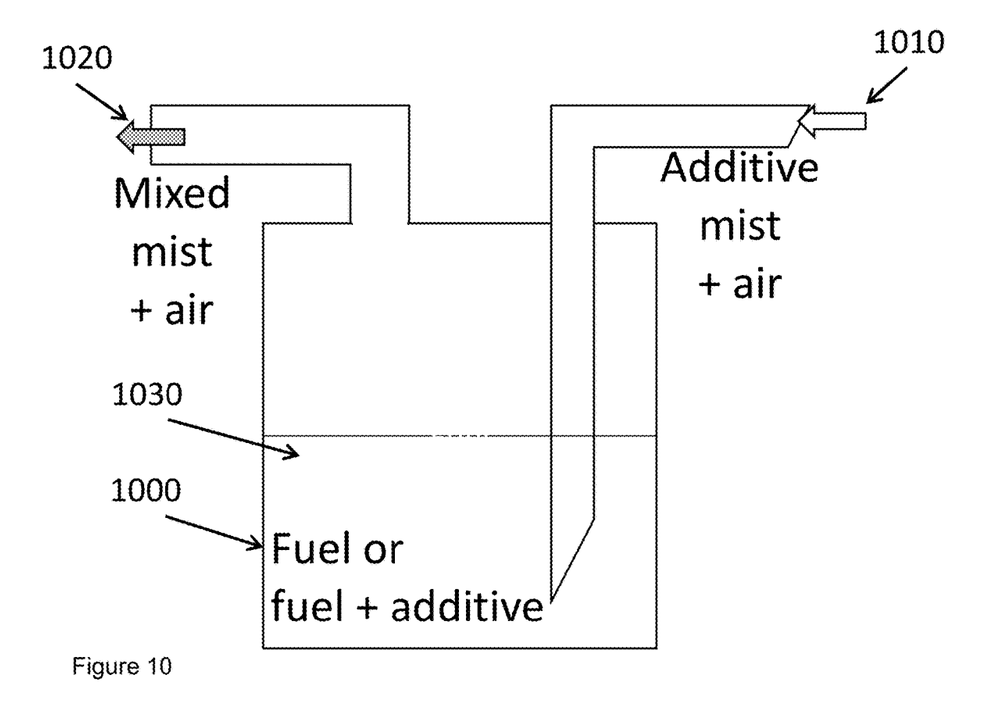

FIG. 10 is a schematic view illustrating a method of mixing a fuel 1030 with a bubbler 1000 by atomising a colloidal solution 1010 prepared according to an embodiment of the present invention. This type of fuel injection can replace the fuel carburettor, especially for mixing with ethanol/methanol fuel. The bubbler can be equipped with a thermostat and a device that stabilizes the mixing ratio by maintaining the height of the fuel. The output of the bubbler is a mixed fuel, and additive mist and air combination 1020.

In this way it will be appreciated that the present teaching provides the composition into the fuel as an aerosol/mist. The colloid or its mixture with water/solvent/hydrogen peroxide/sodium percarbonate can be atomised via one or more of a carburettor or ultrasonic vibrator or air bubbler or sprayer or droplet or any other aerosol delivery method. Indeed, the injection system can incorporate an ioniser and ionisation of the fluid concurrent with its introduction into the fuel system can be achieved through corona discharge or electrostatic induction. This principle of ionisation is the same as commercial air ionisers or electrostatic spray guns but heretofore has not been used in the context of additives for combustion engines. The advantages of using an ioniser is that the mobility and the catalytic activity of the vapour/mist/aerosol are enhanced and the aerosol size and the spraying angle can be adjust.

The air entering the upper right inlet 1010 of FIG. 10 causes a turbulence in the bubbler due to a strong flow rate as the mixed vapour/aerosol/mist enters the fuel (or may be mixed with the combustion additive) container. The bubbles are mixed with the combustion additive, air, and fuel, and are sucked into the engine cylinder through the outlet 1020 at the upper left of FIG. 10. When a bubbler of this structure 1000 is installed instead of a fuel tank, it is usually possible to connect the output end of the bubbler to the air inlet of the engine, and to lock the fuel inlet of the engine, and to optimize the bubbler without special modification of the engine. This scheme is advantageous when ethanol or methanol is used as the main fuel instead of gasoline, because an optimisation of air/fuel mixture is easily obtained.

When the colloidal solution or its mixture with water/solvent/hydrogen peroxide/sodium percarbonate is directly mixed with the fuel, the fuel may be mixed in the pre-stage or the injection stage before being injected into the fuel tank of the combustion system. That is, the additive of the present invention can be mixed into the fuel at a more varied point in time, which can be mixed immediately in the oil refinery to produce the additive in the refinery. This is because the injection amount of the fuel additive can be freely adjusted according to the customer's needs or the quality of the product to be sold. The additive of the present invention may also be injected at gas stations using a commercial emulsification method.

Besides, in addition to the main object to be achieved from the colloidal solution itself of the present invention, it is possible to regenerate the diesel particulate filter when the fine metal particles are present in the fuel. The colloidal solution serves to enable such regeneration to occur at a lower temperature.

In another embodiment of the present teaching and as shown in Table 3, a colloid prepared by the present invention is added as a combustion additive and compared with the fuel consumption before the addition. The test was performed by an independent exhaust emission analysis lab in South Korea. The tested car was Hyundai NF Sonata Gasoline 2.0 L, manual transmission and 92,000 km driven. The test condition was analysing the exhaustion gas on a dyno with 1591 kg inertia weight. After evaluating the initial condition, the colloid was injected and the car was driven by 300 km for 1 week on the road. After the field aging, the colloid was injected and performed evaluation. The colloid was injected through air duct through a needle.

TABLE 3

| Speed (km/h) | 40 | 50 | 60 | 60 | 70 | 70 | 80 | 90 | 100 | 110 | 120 |
|---|---|---|---|---|---|---|---|---|---|---|---|
| Gear | 4 | 4 | 4 | 5 | 4 | 5 | 5 | 5 | 5 | 5 | 5 |
| (a) Fuel Efficiency Baseline (km/L) | 16.9 | 16.0 | 15.1 | 16.5 | 14.2 | 15.6 | 14.6 | 13.5 | 12.4 | 11.1 | 9.8 |
| (b) Fuel Efficiency with Additive (km/L) | 19.4 | 17.8 | 16.7 | 17.6 | 15.3 | 16.8 | 15.7 | 14.6 | 13.2 | 12.4 | 11.3 |
| difference % = (b − a)/a | +14.6 | +11.4 | +10.6 | +6.8 | +7.9 | +7.8 | +7.9 | +8.2 | +7.0 | +11.4 | +15.4 |

As can be seen from the above table, when the colloid of the present invention is used as a combustion additive, the effect of improving the fuel economy as described above has been proved.

As shown in the table, there is a speed region in which the effect of the combustion additive is prominent, and the effect of the fuel economy improvement according to the present invention can be proved. However, the speed range may be variable depending on the type of vehicle and the environment.

In Table 4, the colloid prepared according to the present invention is added to the fuel as a combustion additive, and tested by CVS 75 mode, which is a Korean standard testing method at this time, and the degree of generation of toxic substances before and after addition is compared. The test was performed by an independent exhaust emission analysis lab in South Korea. The tested car was Kia Soul Gasoline 1.6 L, automatic transmission and 20,000 km driven. The colloid was injected through air duct through a needle.

TABLE 4

|  | CO (mg/Km) | NOx (mg/Km) |
|---|---|---|
| Baseline (a) | 134 | 7 |
| Additive Injection (b) | 114 | 3 |
| Difference % = (b − a)/a | −15 | −57 |

As can be seen from the above table, when the colloid of the present invention is used as a combustion additive, the effect of improving the emission of harmful substances as described above has been proved.

In Table 5, the colloid was added to a diesel generator in a mist form through the air duct as a combustion additive. The tested generator is Senci SC6000C, 5.5 KW. A 3 KW heater was connected to the generator as a load and the produced electricity (Wh) was measured with a power consumption meter by using 500 mL of diesel. The exhaustion gas was analysed with Kane Auto 3-7 device. The test was repeated and the value was averaged for 5 times for the initial condition and 5 times for the combustion additive provided condition.

TABLE 5

| | Condition | | |
|---|---|---|---|
| | Generated Power (Wh) | CO (ppm) | NOx (ppm) |
| Baseline (a) | 1214 | 1143 | 464 |
| Additive Injection (b) | 1290 | 960 | 411 |
| Difference % = (b − a)/a | +5.9 | −16.0 | −11.4 |

As seen in the above table, a more power is produced with the colloid of the present invention and the harmful emissions are reduced. This test proves that the colloid makes a positive effect on diesel engine operation as well.

The main effect of the colloid combustion additive injection is an enhancing of the uniformity of combustion. In other words, fuel has a better chance to be mixed with air through the migration of the colloid vapour/aerosol/mist. This will enhance the fuel efficiency and reduce carbon monoxide, CO, hydrocarbon, HC, and soot creation. The key factor that enables high catalytic effect at a low concentration of metal particles is clustering of water-metal particle and its breaking creates charged water molecules with a higher migration-mobility than the normal water vapour.

Since the presence of water will reduce the combustion temperature, it reduces nitrogen oxide, NOx, creation.

This fabrication method has an advantage of making water-nanometal particle clusters since the seed elements of the cluster are directly disintegrated from the originating stainless steel electrodes in the electrolysis process that is used to fabricate the ultimate colloid additive.

The shown electrolysis process for fine metal particles inclusion has a merit of simplicity and low energy consumption of the fabrication process.

In addition, by-products obtained in the electrolysis and filtering process can be recycled as electrets (capacitor with constant voltage recovery behaviour) raw materials, fuel cell catalyser, photo-sensitive raw material for solar cells or photo-sensitive capacitor, a charge separating material for electro-kinetic power generation, high mineral fertilizers, and the like, thereby reducing the occurrence of waste and improving the environment.

In addition, the colloid solution can be utilised as the flowing fluid of electro-kinetic power generation.

In addition, the colloid solution acts as a catalyst to reduce the toxic exhaust gases in the combustion process. The diesel system generally includes a trap for filtering the dust generated from the combustion of the diesel fuel, and introducing fine metal particles into the trap, it is expected that a beneficial effect is obtained in incineration of the dust accumulated in the combustion chamber.

The alkali metal ions contained in the colloid make detergent effect in combustion preventing soot deposition in the chamber.

The air intake injection method has an advantage of keeping the property of the colloid without being affected by the chemicals in the main fuel, since the clustering of the water-metal particle plays an important role.

The air intake injection method has an advantage of controlling the temperature and the electrical charge of the vapour/aerosol/mist separately from the fuel.

The invention claimed is:

1. A combustion additive aqueous colloidal solution having:
   a pH of 8.0 to 12.5,
   a Total Dissolved Solid, TDS, value in the range of 1500 to 3500 ppm,
   an average particle size of 30 nm to 30 μm,
   a sodium constituent having a concentration of 1500 to 3000 mg/L, and
   at least one of Aluminum (Al), Chromium (Cr), Iron (Fe), and Nickel (Ni) constituents having a total concentration of 0.5 to 200 mg/L.

2. The combustion additive colloidal solution of claim 1 having, when measured at 20° C.:
   a DC conductivity of 5 to 13 mS/cm and
   a surface tension of 50 to 70 mN/m.

3. The combustion additive colloidal solution of claim 1 further comprising an ammonia/ammonium constituent having a concentration of 3 to 10 mg/L at 20° C.

4. A combustion additive mixture comprising the colloidal solution of claim 1 mixed with at least one of:
   water;
   water miscible solvents;
   hydrogen peroxide; or
   sodium percarbonate.

* * * * *